Dec. 27, 1960    G. M. KUISMI    2,965,998
TROLLING DEVICE
Filed July 31, 1959    2 Sheets-Sheet 1
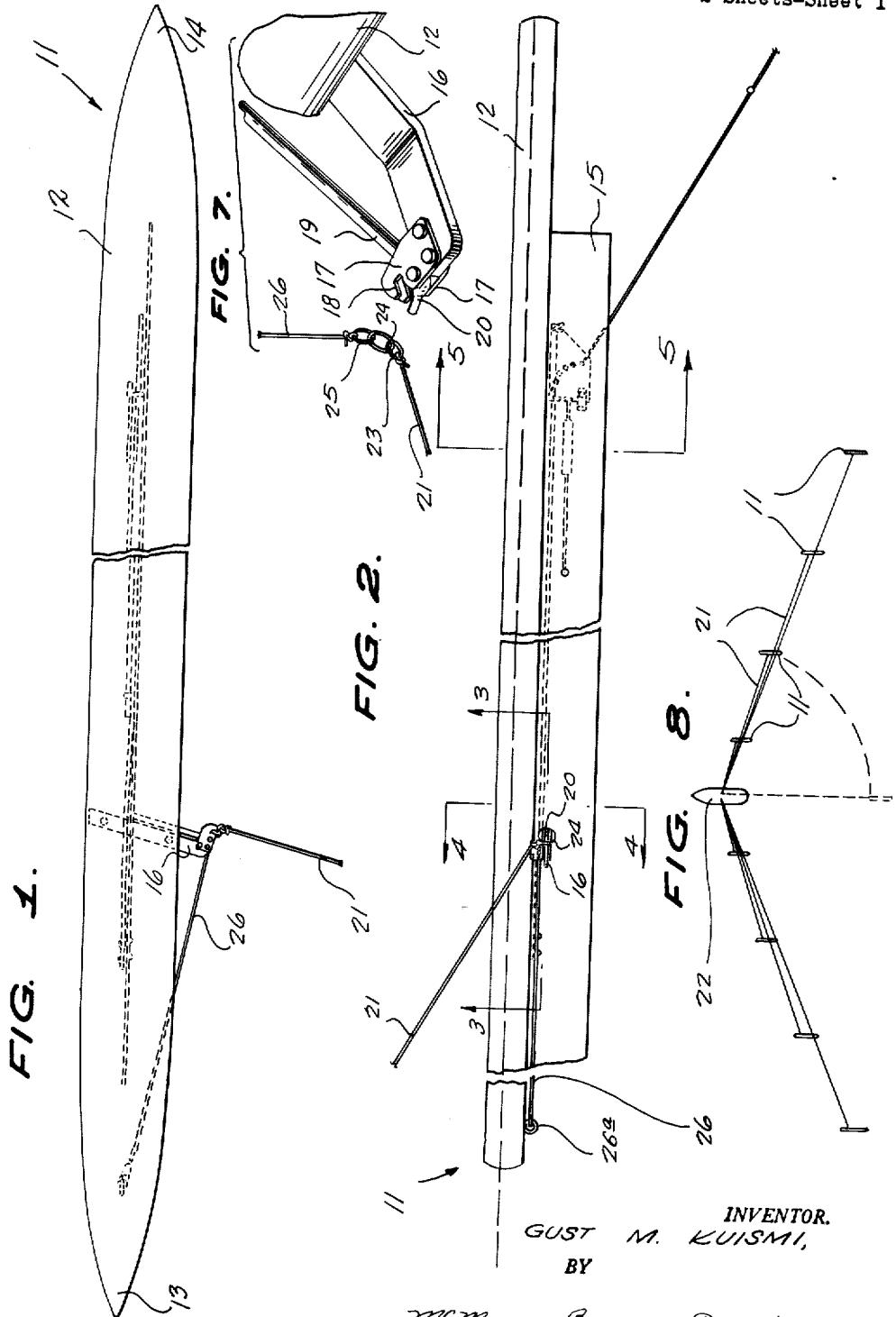
INVENTOR.
GUST M. KUISMI,
BY
McMorrow, Berman & Davidson
ATTORNEYS.

Dec. 27, 1960  G. M. KUISMI  2,965,998
TROLLING DEVICE
Filed July 31, 1959  2 Sheets-Sheet 2
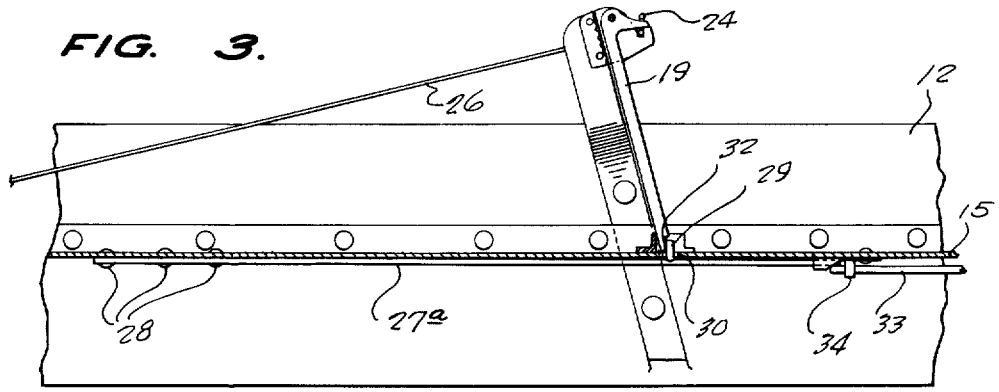
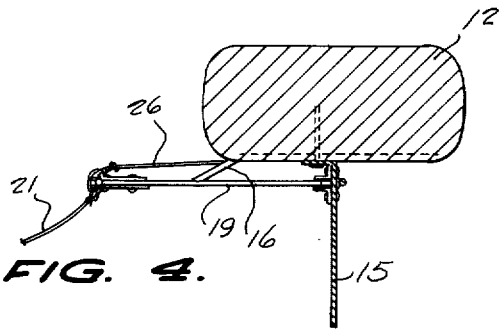
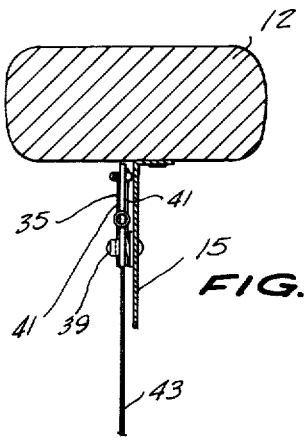
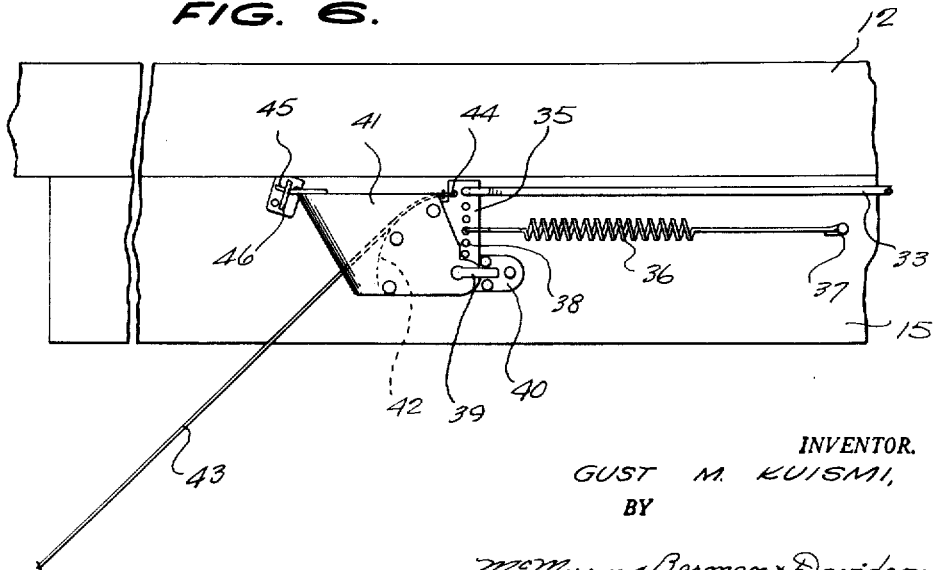
INVENTOR.
GUST M. KUISMI,
BY
McMorrow, Berman & Davidson
ATTORNEYS.

United States Patent Office 2,965,998
Patented Dec. 27, 1960

2,965,998

TROLLING DEVICE

Gust M. Kuismi, Box 337, Ramsay, Mich.

Filed July 31, 1959, Ser. No. 830,922

3 Claims. (Cl. 43—43.13)

This invention relates to fishing equipment, and more particularly to a trolling device for fishing from a moving boat, and whereby a plurality of fishing lines may be spread laterally from a moving boat so as to cover a relatively wide area rearwardly of the boat.

A main object of the invention is to provide a novel and improved trolling device adapted to support a fishing line at a location spaced laterally and rearwardly from a moving boat, the device being arranged so that it responds automatically when a fish engages the line associated with the device, response of the device causing same to move inwardly to a position trailing directly behind the boat.

A further object of the invention is to provide an improved trolling device for use to support a fishing line in a position spaced laterally from a moving boat, the device being simple in construction, being inexpensive to fabricate, and being reliable in operation.

A still further object of the invention is to provide an improved trolling device for use to support a fishing line in a position spaced laterally and rearwardly from a moving boat, the device being durable in construction, being relatively compact in size, and providing a means for supporting a fishing line at a considerable distance laterally from the boat, whereby a large number of fishing lines may be employed with a single boat, the lines covering a relatively wide area on both sides of the boat, Further objects and advantages of the invention will become apparent from the following description and claims, and from the accompanying drawings, wherein:

Figure 1 is a top view of an improved trolling device constructed in accordance with the present invention.

Figure 2 is a side elevational view of the trolling device of Figure 1.

Figure 3 is an enlarged fragmentary horizontal cross-sectional view taken on the line 3—3 of Figure 2.

Figure 4 is an enlarged transverse vertical cross-sectional view taken on the line 4—4 of Figure 2.

Figure 5 is an enlarged transverse vertical cross-sectional view taken on the line 5—5 of Figure 2.

Figure 6 is an enlarged side elevational view of the rear portion of the trolling device of Figures 1 to 5, showing the trigger mechanism thereof.

Figure 7 is a fragmentary enlarged perspective view showing the means for connecting the tow line to the trolling device and the releasable retaining means associated therewith mounted on the main body of the trolling device.

Figure 8 is a top plan view showing diagrammatically the manner in which a plurality of trolling devices according to the present invention are disposed with relation to a fishing boat, and illustrating the manner in which a trolling device automatically swings to a trailing position with respect to the boat responsive to the engagement of a fish with the line associated with the trolling device.

Referring to the drawings, 11 generally designates an improved trolling device according to the present invention. The trolling device 11 comprises an elongated main body member 12 of buoyant material, such as wood or the like, the body being relatively flat and being pointed at both ends, as shown at 13 and 14. Secured to the underside of the body and extending longitudinally thereof for the major portion of its length is the blade-like, depending, relatively thin keel member 15 which may be made of aluminum, or similar corrosion-resistant material.

Designated at 16 is an arm which is secured to the intermediate portion of the underside of the main body member 12 and which projects laterally a substantial distance from the main body member, as shown in Figure 1. Rigidly secured to the outer end of the arm 16 are the parallel, hook-shaped plate members 17, 17, said plate members being formed with the notches 18 facing outwardly, and pivoted between the plate members 17, 17 is a catch lever 19 having a hook-like end portion 20 disposed forwardly of the notches 18 and being received between the hook portions of the plate members 17, 17 when the lever 19 is in a clockwise-rotated position from that illustrated in Figure 7.

Designated at 21 is a tow line adapted to be connected to a fishing boat 22, the tow line 21 being provided at its outer end with a connecting ring 23 which is engaged to a link 24 adapted to be engaged on the substantially straight hook element 20. Engaged with the link 24 opposite the ring 23 is another ring 25 which is connected to the end of a flexible cable member 26. The cable member 26 is attached to an eye 26a secured to the underside of the forward end portion on the main body 12, as shown in Figure 2.

As will be readily apparent from Figure 1, when the link 24 is locked in the notches 18 by the hook element 20, the tow line 21 is, in effect, connected to the intermediate portion of the body 12, whereby the body tends to assume a laterally spaced position with respect to the boat 22 responsive to the forward motion of the boat.

As shown in Figure 1, the arm 16 is connected to the body 12 at a point spaced a substantial distance from the forward end of the body 12 but located in the forward half of said body, so that the forward motion of the boat 22 produces tension on the tow line 21 which normally creates a lateral component of force acting on the keel member 15 which tends to maintain the buoyant body 12 at a position spaced laterally from the fishing boat 22 and at a lateral distance therefrom depending upon the length of the tow line, as is evident from Figure 8.

As will be further apparent, when the link 24 is released from the notches 18, the forward motion of the boat will tend to cause the body 12 to swing inwardly to a position trailing directly behind the boat, since under these conditions the tow line 21 becomes aligned with the short section 26 which is attached directly to the eye 26a provided at the forward end portion of the underside of the body 12.

Designated at 27a is a leaf spring which is located adjacent the depending keel 15 and which is secured thereto, as by a plurality of rivets 28 at one end portion of the leaf spring 27. Leaf spring 27a is provided with a retaining pin 29 which is engageable through an aperture 30 in the keel 15 and which may be disposed in locking position with respect to the catch lever 19, as shown in Figure 3, said catch lever being formed with a notch 32 at its end in which the pin 29 is receivable when the lever 19 is in a position such that the hook element 20 thereof is received between the hook portions of the plate members 17, for example, to retain the link 24 thereon. Thus, as shown in Figure 3, with the link 24 engaged on the hook element 20, a portion of the link 24 will be received in the notches 18 and therefore the link 24 will be retained on the element 20 as long as the lever 19 is held in the position shown in Figure 3, namely, is engaged by the pin 29 at the notch 32 in its end portion.

The spring arm 27a is releasably held in a position located closely adjacent to the keel 15 by a retaining rod 33 which is engaged slidably in an apertured lug 34 located adjacent the free end of the spring member 27a, the rod 33 being movable longitudinally to a position such that the free end of the spring member 27a will be released. The spring member 27a is normally biased so that its free end portion is urged away from the keel member 15, whereby the pin 29 is retracted from the opening 30 when the spring member 27a is released.

Retaining rod 33 is connected at its end opposite the apertured guide lug 34 to a triggering plate 35 pivoted to the keel member 15 for rotation in a plane parallel to the keel member, as shown in Figure 6, the triggering plate 35 being biased in a clockwise direction, as viewed in Figure 6, by a coil spring 36 connected between a pin 37 fixed to the keel 15 and one of a plurality of spaced apertures 38 provided on the forward marginal portion of the plate member 35.

As shown in Figure 6, the plate member 35 is pivoted to the keel 15 at a horizontal pivot loop 39 which is rigidly fastened to the keel 15 by means of a securing bracket plate 40. Thus, the plate 35 is rotatably mounted for rotation parallel to the keel 15. Secured to the plate member 35 on the opposite surfaces thereof are respective guide plates 41 which extend a substantial distance rearwardly beyond the arcuate peripheral edge 42 of the plate member 35 and serve as guide means for a fishing line 43 secured to the top portion of the plate member 35 at 44, as shown in Figure 6. A stop pin 45 is secured to the top edge of one of the guide plates 41 and engages through a loop member 46 secured to the keel 15, said loop 46 serving as a limiting means to limit the rotation of the triggering plate 35 to an angle merely sufficient to retract the retaining rod 33 enough to release spring member 27a when the triggering member 35 is rotated in a counterclockwise direction, as viewed in Figure 6, which may occur when a fish engages the hook on the end of the fishing line 43.

The fishing line 43 is detachably connected to the top end portion of the trigger plate 35 in any suitable manner, for example, by means of a snap hook engaged through an aperture in the top end portion of the triggering plate 35. Thus, as will be presently explained, when a fish is caught and the trolling device swings to a position trailing directly behind the fishing boat 22, the fishing line 43 may be detached and connected to the reel on a fishing rod, whereby the fish may be reeled into the boat. After catching the fish, the fishing line is put back into the water and attached to the triggering plate 35 with the towing device reset to catch the next fish.

Normally, the towing device is set with the link 24 thereof engaged on the hook 20 and held against the plate members 17, 17 in the notches 18 thereof in the manner above described. Thus, the tow line 21 is connected to the body 12 in effect at the end of the arm 16. As previously described, this causes the body to assume a position spaced laterally from the boat in response to the forward movement of the boat 22. The spring member 27a is locked in its retaining position, illustrated in Figure 3, by the engagement of the end portion of the retaining rod 33 with the free end portion of the spring arm 27a. The locking pin 29 engages in the notch 32 to hold the catch lever 19 in locking position. When a pull is exerted on the fishing line 43, as when a fish engages on the hook on the end of the fishing line, the trigger plate 35 is rotated counterclockwise, as viewed in Figure 6, as far as permitted by the loop 46, namely, through the angle whereby the pin 45 moves from the upper arm to the lower arm of the loop 46. This is sufficient to retract the retaining rod 33 from engagement with the free end portion of the spring member 27a, releasing the spring member and causing the pin 29 to disengage from the notch 32. This releases the catch lever 19 and allows the link 24 to disengage from the hook element 20. The tow line 21 is then allowed to swing so that the short flexible line 26 becomes aligned with the main portion of the tow line, whereby the body member 12 swings to a position wherein it trails directly behind the boat 22. This notifies the operator that a fish has been caught, after which the towing device is reeled in so that the fishing line 43 may be detached therefrom and connected to a fishing rod, as above described, allowing the fishing line 43 to be reeled in by the fishing rod.

As will be apparent from Figure 8, a number of trolling devices 11 may be employed with a fishing boat 22, the tow lines 21 of the trolling devices being of different lengths so that the trolling devices will spread out rearwardly of the boat to cover a substantial lateral area on both sides of the boat. When a fish strikes one of the lines associated with the trolling devices, the towing device carrying the fishing line to which the fish has become attached automatically swings to a position trailing directly behind the boat, as above described, allowing the fish to be pulled into the boat.

While a specific embodiment of an improved trolling device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A trolling device comprising an elongated body member of buoyant material, a depending, blade-like keel member secured to the underside of said body member and extending longitudinally thereof, a laterally projecting arm secured to the intermediate portion of said body member, a flexible tow line connected to the forward end portion of said body member, a catch lever pivoted to the outer end portion of said arm and being lockingly engageable with said line, resilient detent means secured to said keel member, movable retaining means engageable with said detent means, a holding element on said detent means constructed and arranged to hold said catch lever in a locking position when said retaining means is engaged with said detent means, a trigger member pivoted to said keel member, means operatively connecting said trigger member to said holding element, and a fishing line connected to said trigger member and being constructed and arranged to rotate said trigger member sufficiently to cause said holding element to disengage from said detent means responsive to a pull on said fishing line, whereby to free said catch lever and allow said flexible line to disengage therefrom.

2. A trolling device comprising an elongated body member of buoyant material, a depending, blade-like keel member secured to the underside of said body member and extending longitudinally thereof, a laterally projecting arm secured to the intermediate portion of said body member, a flexible tow line connected to the forward end portion of said body member at a point located a substantial distance forwardly of said arm, a catch lever pivoted to the outer end portion of said arm and being lockingly engageable with said line, resilient detent means secured to said keel member, movable retaining means engageable with said detent means, a holding element on said detent means constructed and arranged to hold said catch lever in locking position when said retaining means is engaged with said detent means, a trigger member pivoted to said keel member at a point located a substantial distance rearwardly of said arm, means operatively connecting said trigger member to said holding element, and a fishing line connected to said trigger member and being constructed and arranged to rotate said trigger member sufficiently to cause said holding element to disengage from said detent means responsive to a pull on said fishing line, whereby to free said catch lever and allow said flexible line to disengage therefrom.

3. A trolling device comprising an elongated buoyant body provided with a depending longitudinal keel, a laterally-projecting arm on said body secured to the intermediate portion of said body and having one end thereof fastened to said body, a flexible tow line connected to the forward end of said body, a catch lever pivoted on the other end of said arm and lockingly engageable with said line, a pivoted trigger member on the keel, a retaining rod connected to said trigger member, means operatively connected to said rod and lockingly engageable with said catch lever, said rod being retractable to a released position with respect to said catch lever responsive to rotation of said trigger member, whereby to allow said catch lever to release the tow line, and a fishing line connected to said trigger member and being constructed and arranged to rotate said trigger member responsive to a pull on the fishing line.

References Cited in the file of this patent

UNITED STATES PATENTS

| 2,234,943 | Nyman | Mar. 11, 1941 |
| 2,255,465 | Hickey | Sept. 9, 1941 |
| 2,798,331 | Westdahl | July 9, 1957 |
| 2,891,345 | Uhlen | June 23, 1959 |